United States Patent

Jackson

[15] 3,638,095

[45] Jan. 25, 1972

[54] STANDBY POWER CIRCUIT UTILIZING MULTIPLE PULSE MODULATION FOR CONVERTING DC TO AC ELECTRIC POWER

[72] Inventor: Stuart P. Jackson, 1723 Grace Lane, Columbus, Ohio 43221

[22] Filed: July 14, 1969

[21] Appl. No.: 841,365

[52] U.S. Cl. .................................................321/9 A, 321/45 R
[51] Int. Cl. .....................................H02m 1/12, H02m 7/52
[58] Field of Search ................................321/9, 9 A, 9 SW, 45

[56] References Cited

UNITED STATES PATENTS 3,324,376   6/1967   Hunt...........................................321/9
3,334,292   8/1967   King et al. .........................321/9 A UX

OTHER PUBLICATIONS

IEEE Transactions, F. G. Turnbull " Selected Harmonic Reduction in Static DC- AC Inverters," paper 63- 1,011, 1963

Primary Examiner—William H. Beita, Jr.
Attorney—Stefan J. Klauber

[57] ABSTRACT

A standby power circuit of the input voltage to the converter converting direct current electric power into alternating current electric power. Specifically, the circuit utilizes a converter utilizing multiple pulse modulation of the source voltage to equal the amplitude to provide a means of varying the output fundamental voltage and reducing the higher order harmonics.

4 Claims, 6 Drawing Figures

INVENTOR.
STUART P. JACKSON

INVENTOR.
STUART P. JACKSON

BY

ATTORNEY 3,638,095

STANDBY POWER CIRCUIT UTILIZING MULTIPLE PULSE MODULATION FOR CONVERTING DC TO AC ELECTRIC POWER

BACKGROUND

A converter is a device which changes a direct source to one having alternating polarity components. In many applications it is desirable that the output waveform be sinusoidal. For certain types of converters this is provided naturally; such as by the rotation of a coil of wire in a magnetic field as in a motor-alternator set.

There is a class of converters whose basic means of conversion is accomplished by a switching device. The type of switch used may be mechanical (knife switches, etc.), electromechanical (contactors, synchronous switches, etc.), air gap (vacuum tube, gaseous tube, arc, etc.), solid state (transistors, thyristors, etc.) or many others (light, heat, strain, liquid level, rate of change actuated, etc.)

All switching elements have in common, operation in two principal modes; i.e., "open" or "closed." The "open" condition is characterized by high impedance between its major terminals, its "closed" condition by low or negligible impedance between its major terminals. The operating characteristics of switches suggest two major applications: (1) to interrupt current flow and (2) to provide a path for current flow. Sequential or parallel operation of sets of switches not only interrupt current flow to several paths at the same time and provide several paths for current to flow at the same time, but can also serve to reverse polarity of a direct voltage source. With the addition of multiple sources of voltage, voltage level may also be changed by interrupting some current paths and providing for others between the various sources.

In that class of converters using switches as the major element, providing the desirable output waveform, i.e., sinusoidal, poses some difficulties. The operating characteristics of a switch suggest the basic output waveform of the converter is rectangular. Specifically, three basic output waveforms will appear: (1) a "square wave," one whose output polarity reverses twice per cycle, referred to as "simple" modulation, (2) one whose output polarity reverses more than twice per cycle, referred to as multiple pulse modulation, and (3) one whose output may be zero for some portion of the cycle as well as of two polarities, referred to as pulse width modulation.

In the design of a converter, it is desirable that the cost be low and with a reliability that is high, consistent with all other application requirements. This suggests that a minimum of major switching elements be used and that conservatively rated components and circuit redundancy by incorporated in the design. Also, it is desirable to maintain the output voltage of the converter within an allowable band of values. This is necessitated by the normal voltage drops within the converter. Voltage tolerance is aggravated by the voltage drops in the rectifier supplying power to the converter or by the battery voltage variation (2 volts/battery cell ±15 percent from equalize charge to discharge condition). In many applications, the output voltage must be held to some reference value within ±5 percent or ±10 percent to simulate normally available commercial power. It is obvious, as an example, that if a battery supply is used, the ±15 percent voltage variation from the battery reference value must be reduced if the converter is to supply an output voltage within ±10 percent of a reference value.

Thus there are two significant difficulties which must be solved in a satisfactory converter design for many applications. They are output filtering to produce a sinusoidal waveform and secondly to reduce the normal voltage variation to within acceptable tolerances.

SUMMARY

The present invention relates to a standby power supply converter circuit which operates with multiple pulse modulation of the source voltage. With multiple pulse modulation, the amplitude of the input voltage to the converter is equal to that of the source; however, more than one polarity reversal occurs per half cycle. Through a reverse in polarity there will occur a change in the harmonic structure of the output. In one embodiment, the output waveform is that of the simple modulation with a fundamental value of $4E/\pi \sin wt$. In another embodiment, the lowest frequency in the output waveform may be the third, fifth, seventh, 11th, etc., harmonic. Since it is possible to shift the harmonic structure, it is seen that specific output harmonics may be eliminated.

The present invention achieves a variation of the fundamental and also greatly reduces selected harmonics without adding additional power handling thyristors. The ability to vary the output fundamental implies the ability to control the output voltage level by known feedback techniques. Since each angle of polarity reversal must have its supplement, noting the existence of one angle implies the existence of the other angle. The teachings of this invention are applicable to both single and multiple phase applications.

OBJECTS

Accordingly it is a principal object of the present invention to provide an improved standby power supply.

Another object of the invention is to provide a standby power supply which operates by means of multiple pulse modulation of its power source.

Another object of the invention is to provide a standby power supply which operates by means of multiple pulse modulation of its power source.

Another object of the invention is to provide a standby power supply having a means of varying the output fundamental voltage.

Another object of the invention is to provide a standby power supply having reduced lower order harmonics.

Another object of the invention is to provide a standby power supply which utilizes a minimum of major switching elements and conservatively rated components.

Still a further object of the invention is to provide a standby power supply which combines high reliability and low cost.

Another object of the invention is to reduce the total cost of multiple phase outputs such that the difference in cost between multiple phase units and single-phase units is less.

A further object of this invention is to reduce the size, weight and cost of the load coupling transformer.

An additional object of the invention is to reduce the size, weight and cost of the output filter.

Another object of this invention is to provide a means of varying the output fundamental voltage by analog or digital control techniques.

It is a further object of this invention to reduce the losses and thereby increase the efficiency of the converter.

For a complete understanding of the invention, together with other objects and advantages thereof, reference is made to the accompanying drawings, in which:

DESCRIPTION OF THE PREFERRED EMBODIMENT

Referring to the figures in general, there is shown a circuit in which electrical angles may be varied to achieve specific harmonic reduction and the variation of fundamental value.

Figure 1:
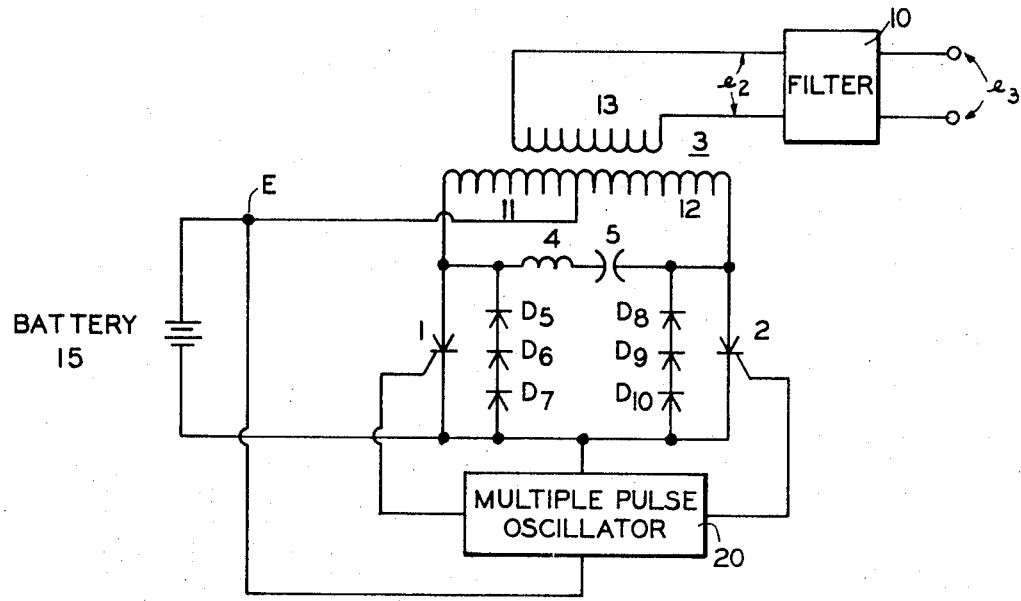
FIG. 1 is a diagrammatic illustration of the preferred embodiment of the invention.

Referring now to FIG. 1 there is illustrated the circuitry of the preferred embodiment of the invention. This converter comprises thyristors 1 and 2, diodes D5, D6, D7, D8, D9, D10, transformer 3 with a tapped primary 11 and 12 and commutating elements, inductance 4 and capacitance 5, to provide turn off potential for thyristors 1 and 2. An oscillator 20 is also shown to provide approximately timed signals to the gates of the thyristors 1 and 2 with respect to their cathodes. These signals serve to turn on the thyristors 1 and 2 from the output wave. Filter 10 serves to filter out the unwanted harmonics from the output wave. The circuit shown in FIG. 1 is disclosed by B. D. Bedford in U.S. Pat. No. 3,303,406. It is to be understood that other converter circuits could also be used with the present invention.

In operation of this circuit with thyristor 1 on, a steady state has been reached and current flows in a closed loop. Current flows from source 15 through the primary windings 11 and 12 of transformer 3, by coupling of the transformer 3 to the secondary load winding 13, to thyristor 1 and returns to source 15. Capacitor 5 is charged to a potential equal to two times $E$ assuming the diode forward voltage drops of D1, D2, D3, and D4 are negligible.

Oscillator 20 now initiates a pulse of current to the gate of thyristor 2 turning it on. A principal path of current flow now occurs through capacitor 5, thyristor 1, diodes D5, D6, D7 and inductance 4. This current provides an appropriate reverse potential across thyristor 1 due to the forward voltage drops of D5, D6, D7 for a sufficient period of time to turn off thyristor 1. Another path exists for capacitor current to flow through capacitor 5, thyristor 2, source 15, D1, D2, D3, D4, transformer 3 and couples to the load winding 13. Normally the load impedances are sufficiently high to make the amount of energy consumed from the capacitor 5 small. The capability of the commutating elements inductance 4 and capacitance 5 to turn off alternatively thyristor 1 and thyristor 2 is dependent on the energy stored in the capacitor 5 prior to commutation. This energy is equal to $$\epsilon_c = (\tfrac{1}{2})C(2E)^2 = 2CE^2.$$

Figure 2:
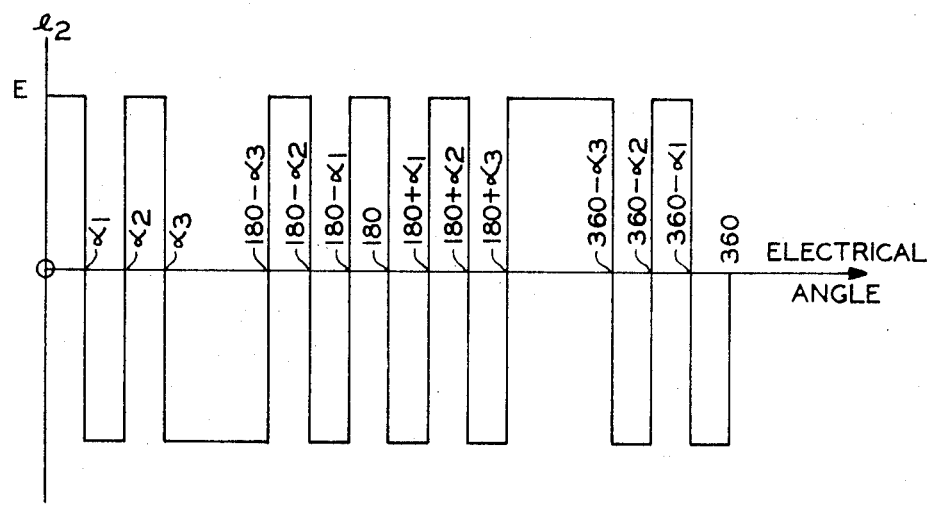
FIG. 2 is a graphical illustration of the output voltage prior to the filter for three angles of reversal.

In accordance with the present invention, FIG. 2 illustrates graphically the normalized output waveform before the filter of the voltage of FIG. 1 with six additional polarity reversals added to the simple modulation system. These angles are $\alpha_1$, $\alpha_2$, $\alpha_3$, and their supplements. Using the Fourier analysis for the coefficients of the terms in the series for six voltage reversals per half-cycle yields:

$$e(n) = \frac{4}{\pi}\int_0^{\alpha_1} E \sin n\theta d\theta - \frac{4}{\pi}\int_{\alpha_1}^{\alpha_2} E \sin n\theta d\theta$$
$$+ \frac{4}{\pi}\int_{\alpha_1}^{\alpha_3} E \sin n\theta d\theta - \frac{4}{\pi}\int_{\alpha^1}^{90°} E \sin n\theta d\theta$$

Eq. (1)

Performing the integration on Equation (1) provides the equation $$e(n) = \frac{4E}{\pi}\left[\frac{1 - 2\cos n\alpha_1 + 2\cos n\alpha_2 - 2\cos n\alpha_3}{n}\right]$$

Eq. (2)

relating the values of the angles of polarity reversal and the magnitude of the $n$th component of the waveform.

The lowest harmonics are the largest and most difficult to filter; therefore, it is desirable to eliminate the third and fifth harmonic. The conditions for the elimination of the third and fifth harmonic under the condition of $\alpha_3 = 90°$ is to require that $1 - 2\cos 3\alpha_1 + 2\cos e\alpha_2 = 0$ and
$1 - 2\cos 5\alpha_1 + 2\cos 5\alpha_2 = 0.$ This results in the electrical angles $\alpha_1 = 23.62°$ and $\alpha_2 = 33.30°$ approximately. By selecting these two angles to make the third and fifth harmonics essentially zero the fundamental is approximately 84 percent of its value for the simple modulation case.

Through the selection of two angles and the elimination of two harmonics, the fundamental is fixed. If, however, only one angle were used to eliminate one harmonic, then the alternative can be used to vary the fundamental value. An example is the selection of the two electrical angles, $\alpha_1$ and $\alpha_2$ only, such that a square wave output containing no fundamental or third harmonic results. This is accomplished by $\alpha_1 = 36°$ and $\alpha_2 = 72°$ (then $180° - \alpha_2 = 108°$ and $180° - \alpha_1 = 144°$) which results in a square wave with the lowest frequency the fifth.

In addition to the elimination of the third and fifth harmonics, it is desirable to vary the fundamental. Since there are three independent variables in equation (2) and only two boundary conditions defined, this may be done. From equation (2) this results in the two equations:

$1 - 2\cos 3\alpha_1 + 2\cos 3\alpha_2 - 2\cos 3\alpha_3 = 0.$  Eq. (3)

and $1 - 2\cos 5\alpha_1 + 2\cos 5\alpha_2 - 2\cos 5\alpha_3 = 0.$  Eq. (4)

Figure 3:
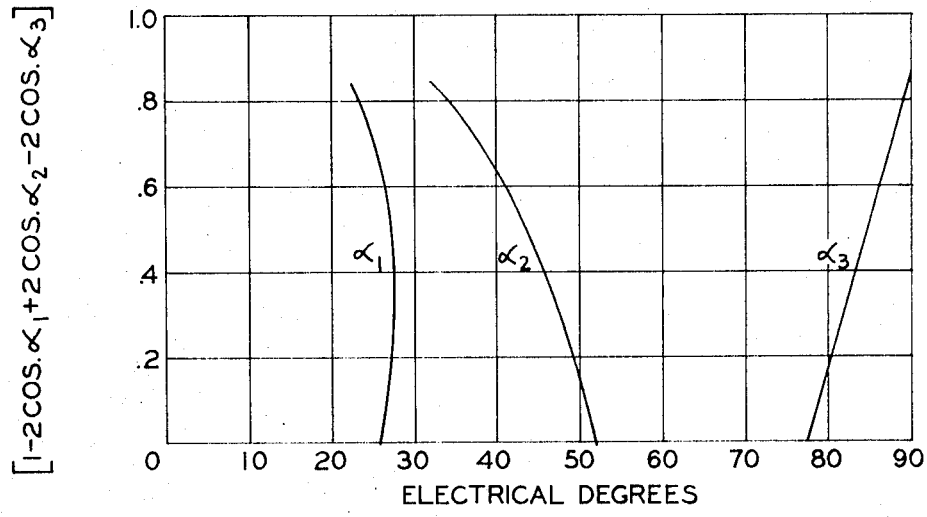
FIG. 3 is a graphical illustration of the angular variation of the voltage reversals of the converter of FIG. 1 for three angles and their supplements.

When equations 3 and 4 are solved simultaneously the values for the individual angles $\alpha_1$, $\alpha_2$, and $\alpha_3$, the results are illustrated graphically in FIG. 3. This graph shows the specific set of electrical angles which must be used for polarity reversal to achieve the given harmonic reduction and fundamental variation. In general, it may be stated that one electrical angle must be selected for each harmonic to be reduced and one for variation of the fundamental.

In the circuits utilizing three-phase outputs, three single-phase units may be used with an output transformer which serves to eliminate the third, ninth, etc., harmonics. In this instance the electrical angles may be chosen to remove the fifth, seventh, 11th, etc. Thus a simpler logic system and therefore a lower cost logic system result for the polyphase converter than for the single-phase converter.

The examples herein included concern only several selections of angles, however, other numbers of angles may be used up to the practical termination defined by the circuit efficiency. If, as an example, 1 percent of the total circuit output power lost as heat results from each polarity reversal, increasing this loss by increasing polarity reversal is undesirable. Such a loss may be compensated by a smaller output transformer, a reduction in the number of components and a reduction in filter cost and loss. As a practical example, take $\alpha_1 = 23.62°$ and $\alpha_2 = 33.30°$, then the transformer which normally operates at 60 Hz. for the fundamental actually operates at the equivalent of $(180/180 - 66.6) 60 = 95$ Hz. square wave. At some point, however, the compensation will not equal the additional losses and a practical cost-loss limit will be reached.

At this point the advantages of the circuit of the present invention becomes apparent. Without additional main power handling components, a variation in the output fundamental is achieved. Further, the essential elimination of selected harmonics there results a substantial reduction in the size of the isolation transformer and output filter. Such a reduction in turn eliminates the attendant loss and deleterious effect on output voltage regulation.

Figure 4:
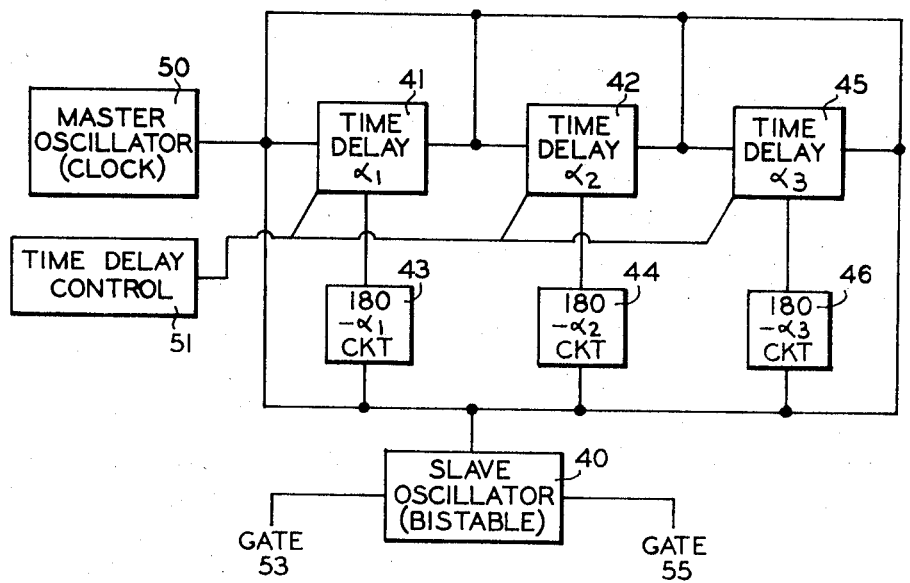
FIG. 4 is a diagrammatic illustration of a typical embodiment of logic circuitry which may be used to obtain the waveforms of FIG. 3 from the preferred embodiment of FIG. 1.

FIG. 4 illustrates in block diagram form a typical logic circuit. The slave oscillator reverses polarity when an impulse is applied to its input. The master oscillator 50 preserves the basic frequency of the output waveform. Impulses are provided to oscillator 40 for each half-cycle by oscillator 50, $\alpha_1$ by time delay 41, $\alpha_2$ by time delay 42, $\alpha_3$ by time delay 45, $180 - \alpha_3$ by circuit 46, $180 - \alpha_2$ by circuit 44, and $180 - \alpha_1$ by circuit 43. The circuits 41, 42, 45, i.e., $\alpha_1$, $\alpha_2$, and $\alpha_3$ may be "stepped" from one value to another as by a switch or made continuous by feedback as desired by means of the time delay control 51.

While FIG. 4 specifically shows three time delay circuits for three electrical angles, $\alpha_1$, $\alpha_2$, and $\alpha_3$, more are possible. The addition of one time delay and one supplemental circuit can be added for each additional electrical angle desired.

Figure 5:
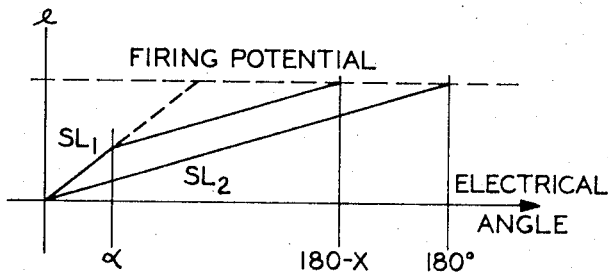
FIG. 5 is a graphical illustration of the voltage characteristics of a circuit which provides the electrical supplement of an angle; and, FIG. 6 is a diagrammatic illustration of a circuit utilizing the principle shown in FIG. 5.

FIG. 5 graphically illustrates the type circuit which may be used to obtain the pulses at electrical angles supplemental to α. Plotted is the voltage at some point vs. electrical angle. For purposes of illustration, assume e is generated by a current source supplying a capacitor. At the beginning of a half-cycle the current source has an initial high value. Thus e increases rapidly. When α is reached, the time delay circuit as well as providing an output pulse, also causes the current source to change to a low value. When e reaches a preset firing potential, an output pulse occurs. The voltage slope SL1 is set so that with high current the firing potential is reached in one-quarter cycle. The slope SL2 is set so that with low current, the firing potential (α=0) is reached at the end of the half-cycle.

Figure 6:
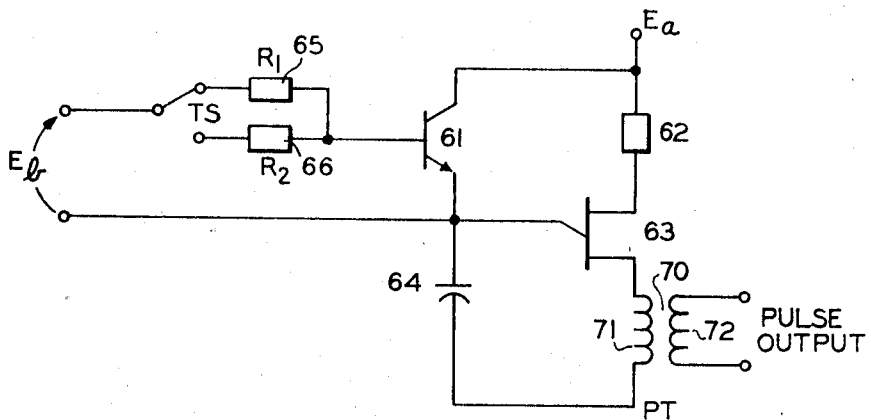

A specific and practical embodiment of a circuit capable of achieving the results desired is shown in FIG. 6. The unijunction transistor 61 provides an output pulse of power by means of the pulse transformer 70 when a preset voltage has been reached by capacitor 64. This present voltage is defined by transistor 63, resistor 62 and the voltage $E_a$. The transistor 61 serves as a current source having an output current equal to its current gain times the current flowing in its base. Base current is defined by voltage $E_a$ and resistors 62 and 63. It should be noted that the normal switching between resistors 62 and 63 provided by switch 64 will be performed by transistors. This can be accomplished a bistable flip-flop circuit actuated by the output pulse from the time delay for $α_1$.

Other types of integrations could be used following the general pattern of FIG. 6. Other techniques can also be used for switching from a "high" current to a "low" current actuated by a pulse.

Although a certain and specific embodiment has been illustrated, it is to be understood that modifications may be made without departing from the true spirit and scope of the invention.

What is claimed is:

1. A standby power supply system the improvement comprising:
   a source of direct voltage,
   an inverter having the output terminals of said source connected thereto,
   said inverter comprising two pulse forming means connected in a complementary configuration,
   a master oscillator having a frequency equal to the basic frequency of the output waveform,
   a plurality of time delay pulse circuits having individual delay times equal to primary predetermined electrical angles,
   a slave oscillator connected to said master oscillator said time delay pulse circuits, and said supplemental time delay pulse circuits,
   said slave oscillator having the electrical characteristic of reversing polarity at predetermined electrical angles when an impulse is applied to its input.

2. A standby power supply system as set forth in claim 1 wherein said source of direct voltage comprises a battery.

3. A standby power supply system as set forth in claim 1 wherein said system further comprises a filter circuit connected to the output terminals of said inverter.

4. A standby power supply system as set forth in claim 1 wherein said predetermined electrical angles correspond to the solution of the equation $$e(n) = \frac{4E}{\pi}\left[\frac{1 - 2\cos n\alpha_1 + 2\cos n_2 - 2\cos n\alpha_3 + \ldots \alpha_n}{n}\right]$$

where $e(n)$ is the voltage magnitude of the $n^{th}$ component of the waveform, $E$ is the source voltage, and $\alpha_1, \alpha_2, \alpha_3, \text{---} \alpha_n$ are the angles of polarity reversal.

* * * * *